US006998594B2

(12) United States Patent
Gaines et al.

(10) Patent No.: US 6,998,594 B2
(45) Date of Patent: Feb. 14, 2006

(54) METHOD FOR MAINTAINING LIGHT CHARACTERISTICS FROM A MULTI-CHIP LED PACKAGE

(75) Inventors: James M. Gaines, Mohegan Lake, NY (US); Michael D. Pashley, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 39 days.

(21) Appl. No.: 10/179,352

(22) Filed: Jun. 25, 2002

(65) Prior Publication Data

US 2003/0234342 A1 Dec. 25, 2003

(51) Int. Cl.
*G01J 1/32* (2006.01)

(52) U.S. Cl. ...................................... 250/205; 362/240

(58) Field of Classification Search ................ 250/205, 250/239, 226; 315/307, 309; 324/750–753; 362/240

See application file for complete search history.

(56) References Cited

U.S. PATENT DOCUMENTS

| | | | | |
|---|---|---|---|---|
| 4,588,883 | A * | 5/1986 | Abbas | 250/205 |
| 4,985,205 | A * | 1/1991 | Fritsche et al. | 422/56 |
| 5,489,771 | A | 2/1996 | Beach et al. | 250/205 |
| 6,107,620 | A | 8/2000 | Shiba et al. | 250/214 |
| 6,239,716 | B1 * | 5/2001 | Pross et al. | 340/815.4 |
| 6,392,214 | B1 * | 5/2002 | Okamoto | 250/205 |
| 6,630,801 | B2 * | 10/2003 | Schuurmans | 315/307 |
| 2001/0032985 | A1 | 10/2001 | Bhat et al. | |

* cited by examiner

*Primary Examiner*—Thanh X. Luu

(57) ABSTRACT

The present invention provides a method, system and structure for maintaining light characteristics from a multi-chip LED package. This may be done by selecting a desired light output and restricting light from a plurality of light emitting diodes in the multi-chip LED package. It may also be done by measuring the restricted light, comparing the measured output light to the desired light and by adjusting current to LEDs in the multi-chip LED package based on the measured light.

20 Claims, 5 Drawing Sheets

METHOD FOR MAINTAINING LIGHT CHARACTERISTICS FROM A MULTI-CHIP LED PACKAGE

FIELD OF THE INVENTION

This invention relates generally to a LED powered lighting system. Specifically, it relates to a method for maintaining light characteristics from a multi-chip LED package.

BACKGROUND OF THE INVENTION

Light emitting diodes (LEDs) are being used more frequently in general illumination applications where they will have to provide high-intensity, constant user-specified color. In order to provide high-intensity light, packages containing multiple LED chips (of the same or different colors) must be used to avoid bulky lamps. We will refer to these below as "multi-chip LED packages".

Light intensity and other properties vary among LED chips. This can cause color variations in light output from multi-chip LED packages. Light intensity and color of a multi-chip LED package can be measured and kept constant with the use of optical sensors and supporting electronics and control systems which are positioned in packages separate from the LED chips. To obtain LED lamps that are compact, consistent in light output, and that require minimal design work from the lamp designer using multi-chip LED packages, integration of the sensors (and possibly other electronics) in the LED package is desirable. Placement of the sensors so that they provide useful signals for control of light output, then would be critical.

It would be desirable, therefore, to provide a system and method for maintaining light characteristics of multi-chip LED packages that overcomes these and other disadvantages.

SUMMARY OF THE INVENTION

One aspect of the present invention provides a method for maintaining light characteristics from a multi-chip LED package. This method includes restricting transmitted light to at least one light sensor to produce a restricted light signal and measuring the restricted light signal by the at least one light sensor to produce a sensed light signal. The method further includes the steps of comparing the sensed light signal to a desired light signal and adjusting current to at least one light emitting diode on the multi-chip LED package based on the comparison.

Another aspect of the present invention provides a system for maintaining light characteristics from a multi-chip LED package. The system may include means for restricting transmitted light to at least one light sensor to produce a restricted light signal and means for measuring the restricted light signal by the at least one light sensor to produce a sensed light signal. The system also includes means for comparing the sensed light signal to a desired light signal and means for adjusting current to at least one light emitting diode on the multi-chip LED package based on the comparison.

Yet another aspect of the present invention provides a structure for maintaining light characteristics from a multi-chip LED package. The structure includes a plurality of LEDs; at least one enclosure positioned to receive an amount of light output from the plurality of LEDs; at least one light sensor positioned in the enclosure to measure the light output from the plurality of LEDs; and a controller operably connected to the LED chips to control current to the LED chips based on the measured light.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
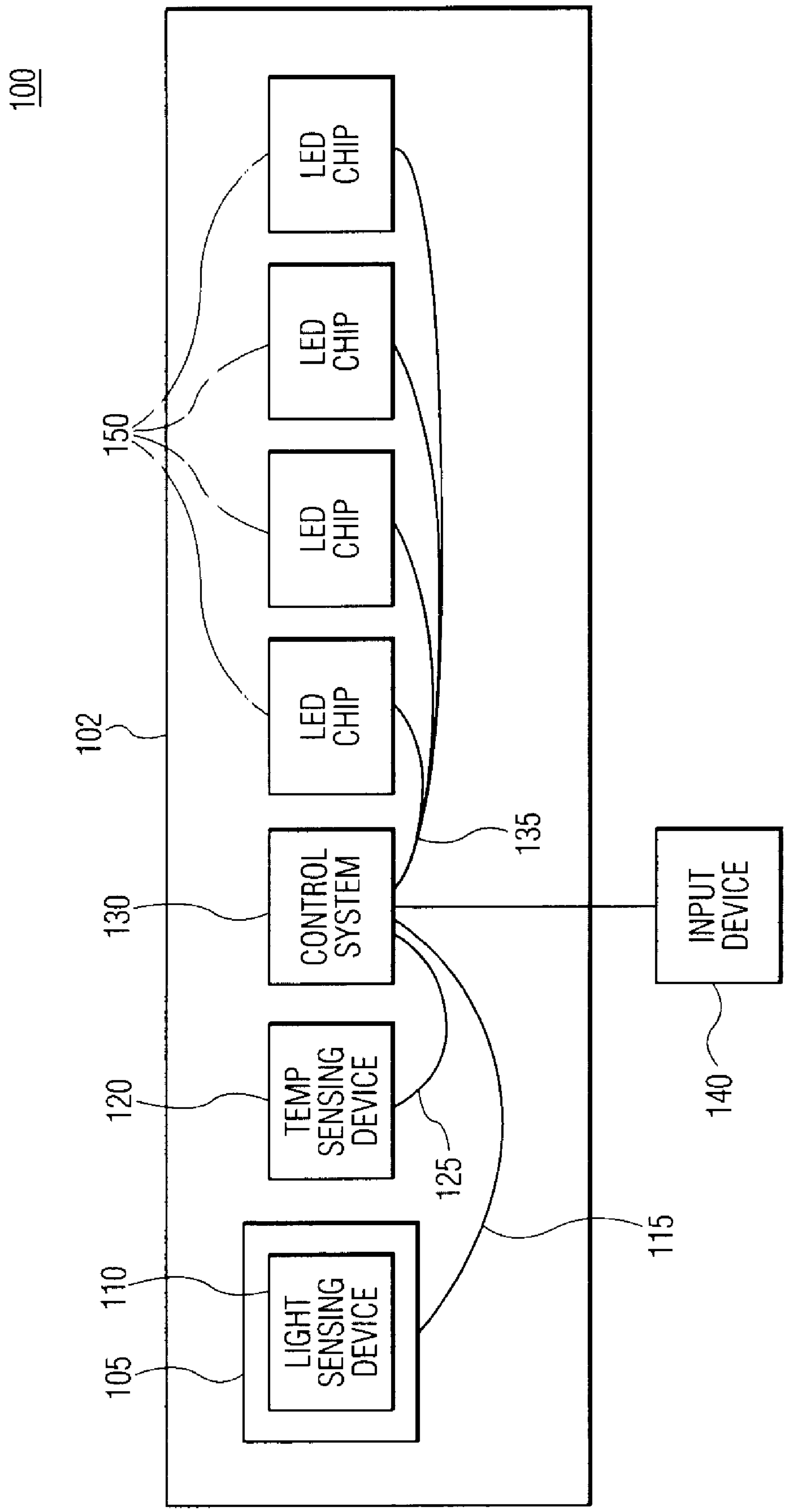
FIG. 1 is a schematic diagram of one embodiment of a system for maintaining light characteristics from a multi-chip LED package in accordance with the present invention.

FIG. 1 shows one embodiment of a system for maintaining light characteristics from a multi-chip LED package in accordance with the present invention at 100. In one embodiment, the system 100 may include a multi-chip LED package 102 and input device 140.

Multi-chip LED package 102 may include control system 130, temperature sensing device 120, light emitting diode (LED) 150 and light sensing device 110.

Multi-chip LED package 102 includes at least one Light Emitting Diode chip 150 with connecting electronics 135. The LED may be, for example, Red, Green or Blue in color, and in another example, a plurality of LEDs may be all one color or may be a combination of colors. Other embodiments of system 100 may include white LED chips, other colors of LED chips or combinations of colored and white LED chips.

The multi-chip LED package 102 also includes control system 130. In one embodiment, the control system may be any suitable hardware or software, or combination of hardware and software that performs logic processing such as a computer chip with RAM. This control system 130 may be operably connected to system components 110, 120, 140, 150 with control system electronics wiring 115, 125, 135 or any other suitable connection known in the art. The control system 130 may alter the current flow to the various system components via the wiring 115, 125, 135. For example, the control system electronics 130 may alter the current flowing into the LED chips 150 via electronics wiring 135. The computer software in the control system 130 may include instructions to control current flow to various system components by any suitable means known in the art.

Figure 3:
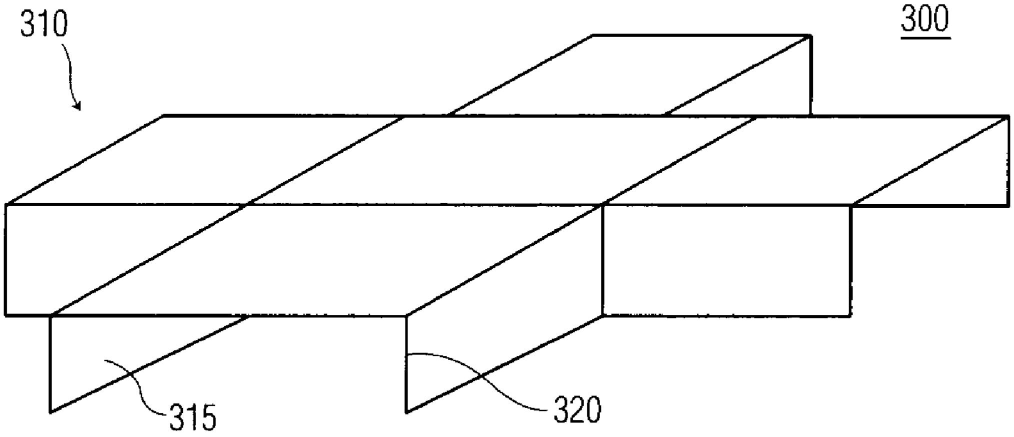
FIG. 3 to FIG. 6 are schematic diagrams of various embodiments of a system for maintaining light characteristics within a multi-chip LED package in accordance with the present invention.

The multi-chip LED package 102 may also include an enclosure 105, surrounding a light sensing device 110. Referring now to FIG. 1 and FIG. 3, which illustrates an exemplary embodiment of an enclosure 105, enclosure 310 includes at least one aperture 320, opening towards an LED, that channels light emitted from a light source (LED) to the light sensing device 110. The aperture 320 may be of various sizes and shapes depending on the placement and number of LEDs associated with each enclosure, this is discussed in greater detail below in relation to FIGS. 4–6. The size of these apertures may determine the amount of light that reaches the light sensors. In one embodiment, the enclosure interior 315 is a white interior, which provides a more efficient combining of light from different desired light sources. The apertures determine how much light from which LEDs enters the enclosure. Once it is in the enclosure, the white interior surface mixes the admitted light. The purpose of this internal mixing is to make the photodiode less sensitive to variations among the LEDs that it is measuring.

The multi-chip LED package 102 also includes at least one light sensing device 110 located within enclosure 105. The light sensing device may be a photodiode, a photoconductor or any other suitable light sensing device known in the art. The light sensing device may be positioned such that the light transmitted from adjacent LEDs passes through the aperture and to the light sensor. The light sensor 110 converts the transmitted light to a sensed light signal. The light sensing device 110 may be operably connected 115 to the control system 130 by electronics wiring, fiber optics or any other suitable connecting means known in the art. The transmitted light from the LEDs may be restricted from or allowed to impinge upon the light sensors. This may be accomplished by the placement of the sensors beneath the enclosure 105, the placement of the LED chips, by the shape of the enclosure, or combinations thereof.

The multi-chip LED package 102 may include a temperature sensing device 120 operably connected to the control system 130. This temperature sensing device may be a thermocouple or any other suitable means known in the art used to measure the temperature of a component. The temperature sensing device may be used to measure the temperature of the LEDs used in this multi-chip LED package 102. The temperature sensing device 120 may be configured to measure LED temperature continuously or at specified intervals of time, for example, every two seconds. In one embodiment, the temperature sensing device may be included within the multi-chip LED package 102. In another embodiment, the temperature sensing device may be connected to and monitor the temperature of a heat sink upon which the multi-chip LED package system 100 is mounted.

The system may also include an input device 140, wherein the user may predetermine the color and intensity of the desired light output. In one embodiment, this input device 140 is a handheld keypad with an electronic selection menu. The input device may also be a keypad mounted on the wall or a personal computer operably connected to the control system 130. In practice, the user may simply push buttons on the keypad to select the corresponding profile of the light desired. For example, the user may select an off white color and a high-intensity bright light. The input device 140 may be any suitable hardware or software, or combination of hardware and software that allows the user to select a preferred profile of light.

Figure 2:
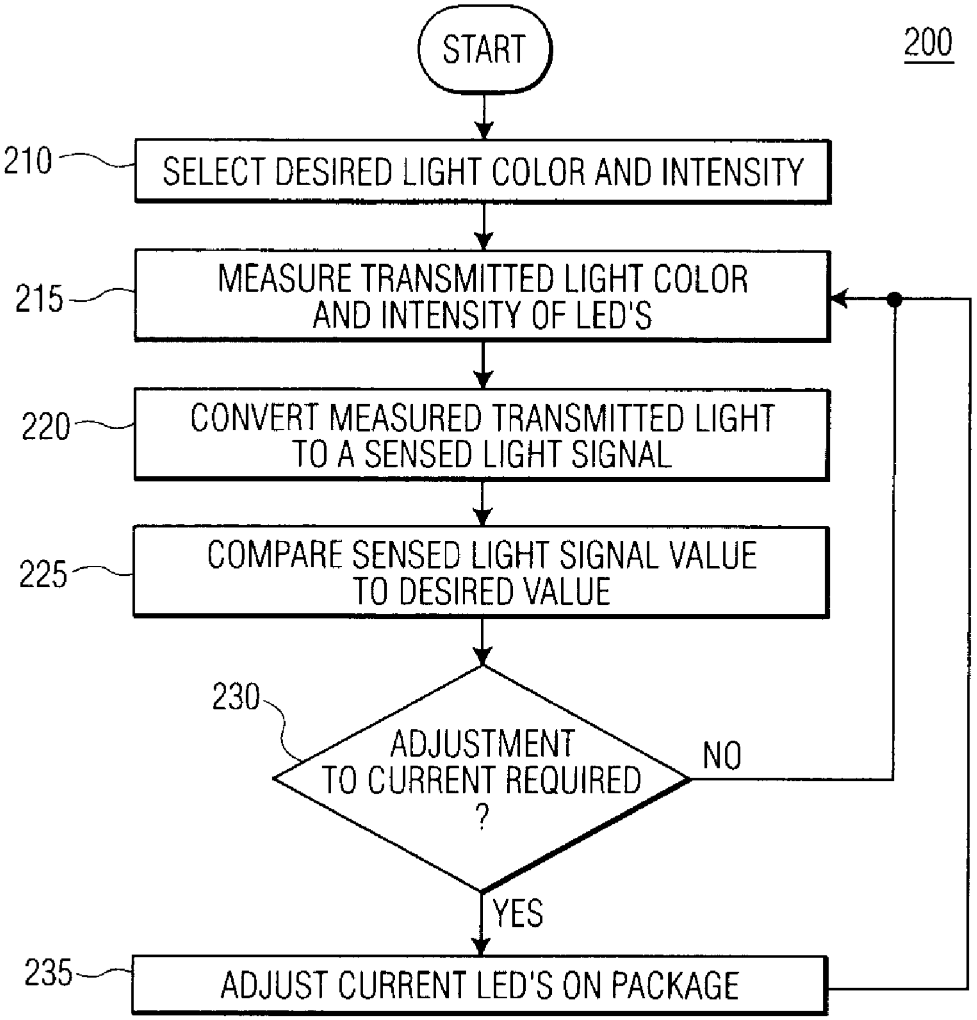
FIG. 2 is flow diagram of one embodiment of a system for maintaining light characteristics from a multi-chip LED package in accordance with the present invention.

Referring now to FIG. 2, a method for maintaining light characteristics of a multi-chip LED package is shown generally at 200. In practice, the user selects a desired light profile (Block 210) using input device 140. The desired light profile includes the color and intensity of the transmitted light.

Once the multi-chip LED package 102 begins to transmit light, a sensor 110 associated with each of the LEDs measures the transmitted light for both color and intensity (Block 215). The sensor 110 converts the measured transmitted light to a sensed light signal (Block 220). In one embodiment, the overall light color and intensity may be determined by the summation of all the individual light intensities of the individual LEDs. In another embodiment, the individual values of each separate color are summed to obtain a sensed light signal value for that specific color. For example, the sensed light signal for each red LED is summed for a total sensed signal value.

The determined sensed light signal is then compared to the desired light signal value that is associated with the desired light profile the user selected (Block 225). The results of the comparison will determine whether an adjustment of the current to one or more LED is required (Block 230). If the sensed light value is within a predetermined acceptable range of the desired light signal value the method returns to Block 215. However, if the sensed light signal is not within that predetermined range, the current to one or more LED will be adjusted (Block 235) and the method will return to Block 215 for continued monitoring of the multi-chip LED package.

Altering the current flow to the LEDs alters the color and intensity of the light emitted from the multi-chip package. Based on the selected desired light profile, the control system determines the amount of current to be released to the various components in the multi-chip LED package. The profile of the desired light characteristics may be used to evaluate the light measured by the light sensor. Current flowing to the components of the system may then be adjusted by the control system 130 to alter the light emitted from the LEDs. This process may be continued until the desired light is no longer demanded.

In another embodiment, the temperature sensor 120 also may measure the temperature of the LEDs. As long as the temperature remains constant within acceptable limits for the particular multi-chip LED package, the current flow rate to the components will be maintained by the control system. However, if the measured temperature is not within acceptable limits, the control system 130 will alter the current flow to the LEDs as required.

Figure 4:
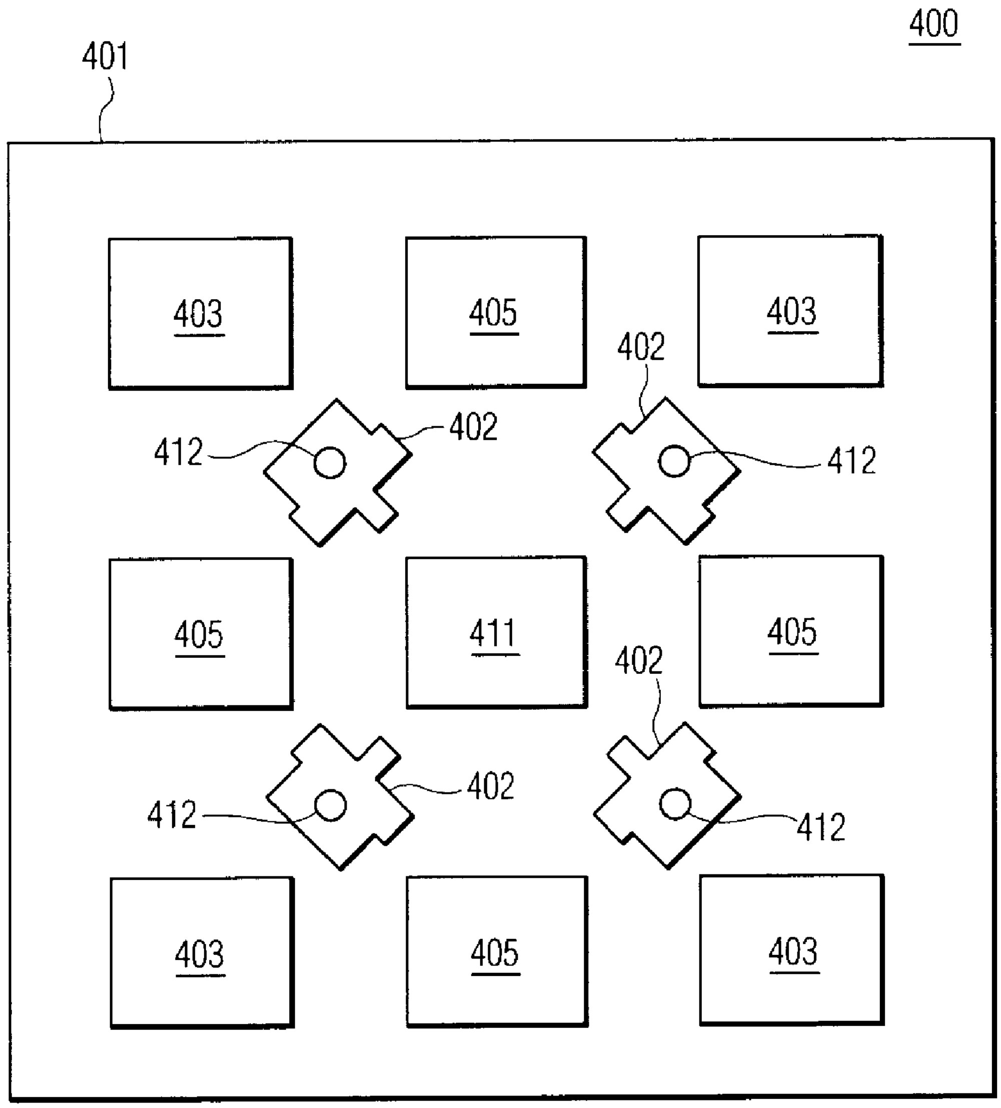

Referring now to FIG. 4, an exemplary arrangement of the LED chips, enclosures and light sensors of a multi-chip LED package is shown generally at 400. Light sensors 412 may be positioned on the multi-chip package to measure the light intensity from the LED chips located on the package. The sensors 412 may be positioned where they may monitor a plurality of LEDs on the package. The sensors 412 may be partially covered by an enclosure 402 that channels incoming light to the sensor 412. In one embodiment, the enclosure may control the amount of light that impinges upon the sensors. The enclosure 402 may have various apertures that face adjacent LED chips 403, 405, 411. The total intensity and color of the multi-chip LED package 401 may be determined by summing the intensity of each LED chip.

The enclosure may have smaller apertures that face LED chip 411. In LED package 401, the control system may measure the intensity of the LED chips 403, 405, 411. LED chip 411 may be measured by four sensors 412 which may be covered by enclosures 402. Because this measuring may result in an over-consideration of LED chip 411, the apertures of enclosures 402 that face LED chip 411 may be reduced to ¼ of the size of the other apertures that face the corner LED chips 403. This ratio is equal to the inverse of the number of times a specific LED chip is measured. For example, LED chip 405 may be measured by two sensors 412 so the aperture facing LED chips 405 may be reduced to ½ of the size of the other apertures that face the corner LED chips 403. These ratios may not be exact and may depend on the distribution of light actually emitted by the LEDs. It may be assumed that the LED chips 403, 405, 411 may be of equal size and may be positioned equidistant from the sensors 412.

If filtered photodiodes are used in this system, the light emitted from various colors of LED chips may be sampled simultaneously. If unfiltered photodiodes are used on the LED chips only one color may be measured at a time using a time multiplex sampling method. For example, in a package containing red, blue and green LED, the green and blue LEDs may be turned off, while the red LEDs light intensity is measured. Immediately following this step, the red and green LEDs may be turned off, while the blue LEDs light intensity is measured. Immediately following this step, the red and blue LEDs may be turned off, while the green LEDs light intensity is measured. The results of these measurements may be sent to the control system 130 and used to determine whether the current to the various devices needs to be altered in order to achieve the desired light output.

Figure 5:
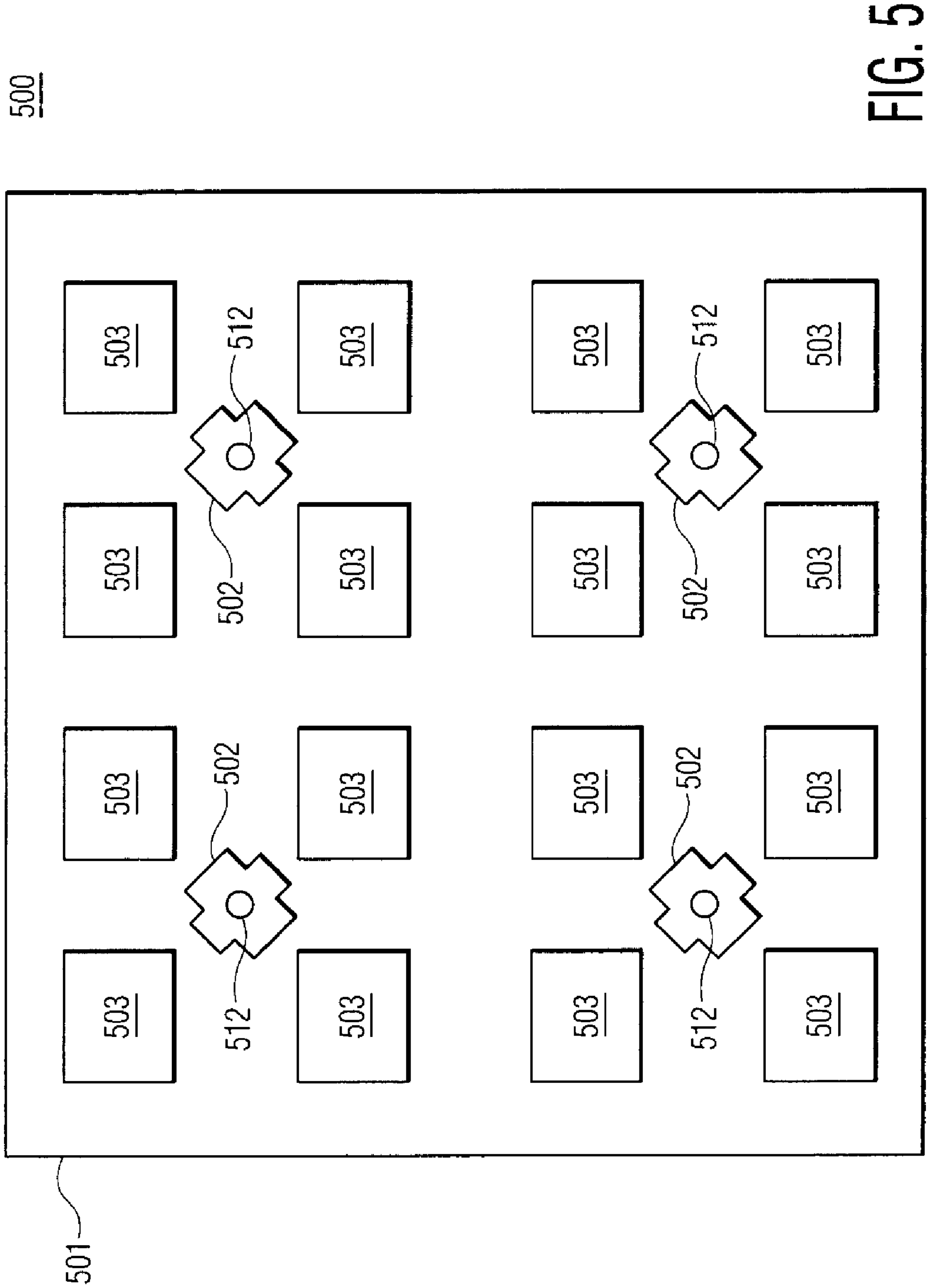

Referring now to FIG. 5, another exemplary arrangement of the LED chips, enclosures and light sensors of a multi-chip LED package is shown generally at 500.

Because each LED chip 503 in the array of multi-chip LED packages faces only one aperture of the enclosure 502 the LED may be measured once. Also, because each LED chip 503 may be the same size and may be equidistant from each enclosure 502, the apertures of enclosure 502 may be the same size.

Figure 6:
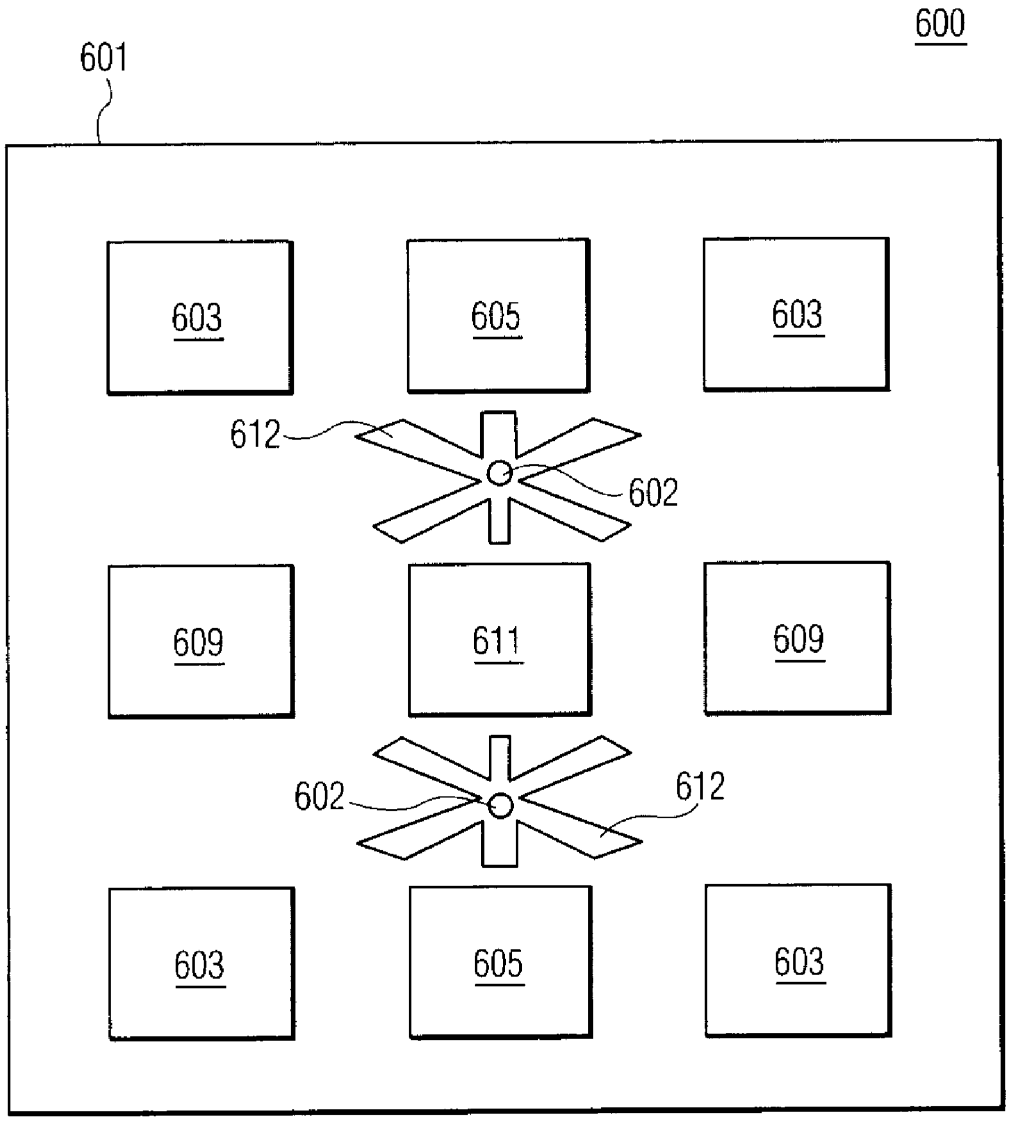

Referring now to FIG. 6 yet another exemplary arrangement of the LED chips, enclosures and light sensors of a multi-chip LED package is shown generally at 600.

Similar to the multi-chip package shown generally at 400, the system may include LED chips 603, 605, 609, 611 with connecting electronics, enclosures 612 and at least one optical sensor 602 all operably connected together and mounted on the multi-chip package 601. The system may operate as that of the system in FIG. 4, generally shown at 400; however two enclosures may be used instead of four. Similar to FIG. 4 the ratio of one LED to the number of times the LED is measured may be determined to calculate the relative size of the apertures facing each the LED chips 603, 605, 609, 611 on the LED multi-chip package 601.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of maintaining light characteristics from a multi-chip light emitting diode (LED) package having a plurality of LED chips, comprising:

providing at least one enclosure having a plurality of apertures, each aperture having a respective predetermined size and facing a respective one of said LED chips;

providing a light sensor disposed in said at least one enclosure, said at least one enclosure being arranged such that each of said plurality of apertures channels light from the corresponding respective one of said LED chips to said light sensor;

restricting light received by said light sensor from said corresponding respective one of said LED chips to produce a restricted light signal, said restricting being proportioned at least in part according to the respective predetermined size of the aperture facing said corresponding respective one of said LED chips;

measuring the restricted light signal produced by said light sensor to produce a sensed light signal;

comparing the sensed light signal to a desired light signal to produce a result; and adjusting current to at least one LED on the multichip LED package based on the result.

2. The method claimed in claim 1, characterized in that said at least one enclosure is provided with an interior arranged for efficient combining of light from different light sources through different apertures.

3. The method claimed in claim 2, characterized in that said interior is provided as a white interior.

4. The method claimed in claim 1, characterized in that the respective predetermined sizes of at least two apertures of said at least one enclosure are mutually different.

5. The method claimed in claim 4, characterized in that said at least one enclosure is provided with an interior arranged for efficient combining of light from different light sources through different apertures.

6. The method claimed in claim 5, characterized in that said interior is provided as a white interior.

7. The method claimed in claim 1, characterized in that at least two said enclosures are provided, each enclosure having a respective sensor disposed therein;

the respective predetermined sizes of at least two apertures of at least one of said enclosures are mutually different;

one of said LED chips is faced by one respective aperture each of said at least two said enclosures; and a ratio of the mutually different predetermined sizes is determined at least in part by the inverse of the number of times light from said one of said LED chips is measured.

8. The method claimed in claim 7, characterized in that measuring the restricted light signal comprises a time multiplex sampling.

9. The method claimed in claim 7, characterized in that said ratio further depends on the distribution of light actually emitted by said LED chips.

10. The method claimed in claim 9, characterized in that said at least one enclosure is provided with an interior arranged for efficient combining of light from different light sources through different apertures.

11. A system for providing LED-based light having desired characteristics, comprising:

a multi-chip light emitting diode (LED) package having a plurality of LED chips, said package including at least one light sensor; and means responsive to a sensed light signal from the light sensor for comparing the sensed light signal to a desired light signal to produce a result, and for controlling current to said LED chips based on the result;

characterized in that the LED package further includes:

means for restricting light received by said light sensor to produce a restricted light signal, said means comprising at least one enclosure having a plurality of apertures, each aperture having a respective predetermined size and facing a respective one of said LED chips, and said at least one light sensor being disposed in said at least one enclosure, said at least one enclosure being arranged such that each of said plurality of apertures channels light from the corresponding respective one of said LED chips to said light sensor, and further arranged such that light received by said at least one light sensor is proportioned at least in part according to the respective predetermined size of the aperture facing said corresponding respective one of said LED chips; and the system further comprises means for measuring the restricted light signal produced by said light sensor to produce the sensed light signal.

12. The system claimed in claim 11, characterized in that said at least one enclosure is provided with an interior arranged for efficient combining of light from different light sources through different apertures.

13. The system claimed in claim 12, characterized in that said interior is provided as a white interior.

14. The system claimed in claim 11, characterized in that the respective predetermined sizes of at least two apertures of said at least one enclosure are mutually different.

15. The system claimed in claim 14, characterized in that said at least one enclosure is provided with an interior arranged for efficient combining of light from different light sources through different apertures.

16. The system claimed in claim 11, characterized in that at least two said enclosures are provided, each enclosure having a respective sensor disposed therein;

the respective predetermined sizes of at least two apertures of at least one of said enclosures are mutually different;

one of said LED chips is faced by one respective aperture each of said at least two said enclosures; and a ratio of the mutually different predetermined sizes is determined at least in part by the inverse of the number of times light from said one of said LED chips is measured.

17. The system claimed in claim 16, characterized in that measuring the restricted light signal comprises a time multiplex sampling.

18. The system claimed in claim 16, characterized in that said ratio further depends on the distribution of light actually emitted by said LED chips.

19. The system claimed in claim 18, characterized in that said at least one enclosure is provided with an interior arranged for efficient combining of light from different light sources through different apertures.

20. The system claimed in claim 19, characterized in that said interior is provided as a white interior.

* * * * *